United States Patent [19]

Ohta et al.

[11] 4,203,628
[45] May 20, 1980

[54] ANTI-BRAKE-VIBRATION TYPE PROPORTIONING VALVE

[75] Inventors: Takaaki Ohta, Okazaki; Sadayoshi Ito, Toyota, both of Japan

[73] Assignee: Toyota Jidosha Kogyo Kabushiki Kaisha, Aichi, Japan

[21] Appl. No.: 936,502

[22] Filed: Aug. 24, 1978

[30] Foreign Application Priority Data

Jan. 3, 1978 [JP] Japan .................... 53-23281

[51] Int. Cl.² .............................. B60T 8/26
[52] U.S. Cl. .................................. 303/6 C
[58] Field of Search .............. 188/349; 303/6 C, 22 R

[56] References Cited

U.S. PATENT DOCUMENTS

| | | | |
|---|---|---|---|
| 3,976,334 | 8/1976 | Farr | 303/6 C |
| 4,062,597 | 12/1977 | Sawyer et al. | 303/6C |

Primary Examiner—Duane A. Reger
Attorney, Agent, or Firm—Browdy and Neimark

[57] ABSTRACT

A proportioning valve for a hydraulic brake system having a capability of preventing brake vibration. In this proportioning valve a piston, which is exposed at one end thereof to an air chamber and constantly biased with a spring in a separating direction away from the air chamber, opens and closes a cut valve disposed in a braking fluid circuit from the master cylinder to the rear wheel cylinder(s) for performing fluid pressure regulating operation. The piston is further designed such that the stroke thereof is larger than it ought to be for the proper object, with the purpose of operating as a piston for absorbing fluid pressure vibration in the rear wheel cylinder(s) while the braking fluid pressure is relatively low, and as an ordinary fluid pressure regulating piston after the braking fluid pressure exceeds a predetermined set value.

6 Claims, 5 Drawing Figures

ANTI-BRAKE-VIBRATION TYPE PROPORTIONING VALVE

BACKGROUND OF THE INVENTION

The present invention relates to the prevention of vibration in a vehicle hydraulic brake.

In a vehicle provided with a hydraulic brake, uneven thickness of the disc rotor, insufficient cylindricity of the brake drum, etc., may cause vibration of the car body or the steering system, and some times pulsatile movement of the brake pedal. These are generally called a brake vibration. Uneven thickness of the disc rotor, insufficient cylindricity or insufficient concentricity of the brake drum, etc., may retroactively cause, through the vibration of the brake pads or brake shoes which urge the disc or drum, periodical fluctuation of fluid pressure (hereinafter simply called fluid pressure vibration) in the relevant wheel cylinders. It consequently brings about a fluctuation of braking torque. Conventional efforts for preventing the brake vibration have been focused only on the enhancement of the precision in manufacturing of such parts as disc rotor or brake drum, or in assemblying of those, seeking a favorable construction thereof to avoid errors in fixing. Efforts and endeavors in this direction have resulted in rising of cost and in arriving at a practical limit of machining technology. This invention has been made from such a background.

SUMMARY OF THE INVENTION

It is therefore a primary object of this invention to prevent the brake vibration in the hydraulic brake in a vehicle.

It is another object of this invention to provide a device which is capable of attaining the above-mentioned ideal while holding down the manufacturing cost as low as possible.

It is still another object of this invention to provide a proportioning valve having a capability of preventing brake vibration.

This invention is, in essence, a success which achieved the above-mentioned objects of slightly improving the proportioning valve, which is to be installed, in the hydraulic fluid circuit connecting the wheel cylinder(s) to the master cylinder, with the object of controllng the fluid pressure to the rear wheel cylinder(s) on the vehicle rear wheel(s). The purpose of the proportioning valve is, as well known widely, to regulate the fluid pressure in the rear wheel cylinder(s) for preventing the skid of the rear wheel. The proportioning valve generally has a piston which is provided with greater pressure receiving area and a smaller pressure receiving area, having a cut valve inbetween, the former receives the pressure of the rear wheel cylinder(s) and the latter receives the pressure of the master cylinder. The piston, disposed in the proportioning valve in this way, constantly biased, by a spring means, to the greater pressure receiving area, makes the cut valve open or close due to its shifting, in order to regulate the fluid pressure in the rear wheel cylinder(s) so as to hold down the rate of pressure rising therein lower than that in the master cylinder, when the fluid pressure in the master cylinder exceeds a certain predetermined value (this function is hereinafter called pressure reducing operation). By means of increasing the piston stroke greater than usual, and decreasing the set load of the spring means smaller than usual, the proportioning valve can be given a capability of preventing the brake vibration, absorbing the fluid pressure fluctuation (vibration). The piston of the proportioning valve is generally faced to an air chamber at one end thereof, in order to form the two, greater and smaller, pressure receiving areas, and biased to an alienating direction therefrom by a spring means, which is said a quite suitable construction for mitigating the fluid vibration. Besides, the fluid pressure vibration, which causes the brake vibration, takes place usually within a certain limited range of fluid pressure and this range of pressure is usually located lower than the point where the pressure reducing operation of the proportioning valve is initiated. It allows the proportioning valve to additionally have the brake vibration preventing function, without degrading the inherent function of the regulation of the braking fluid pressure, by means of slightly altering the opening stroke of the cut valve and the load characteristic of the spring means.

DETAILED DESCRIPTION OF THE PREFERRED EMBODIMENTS

With reference to the appended drawings preferred embodiments will be described hereunder.

Figure 1:
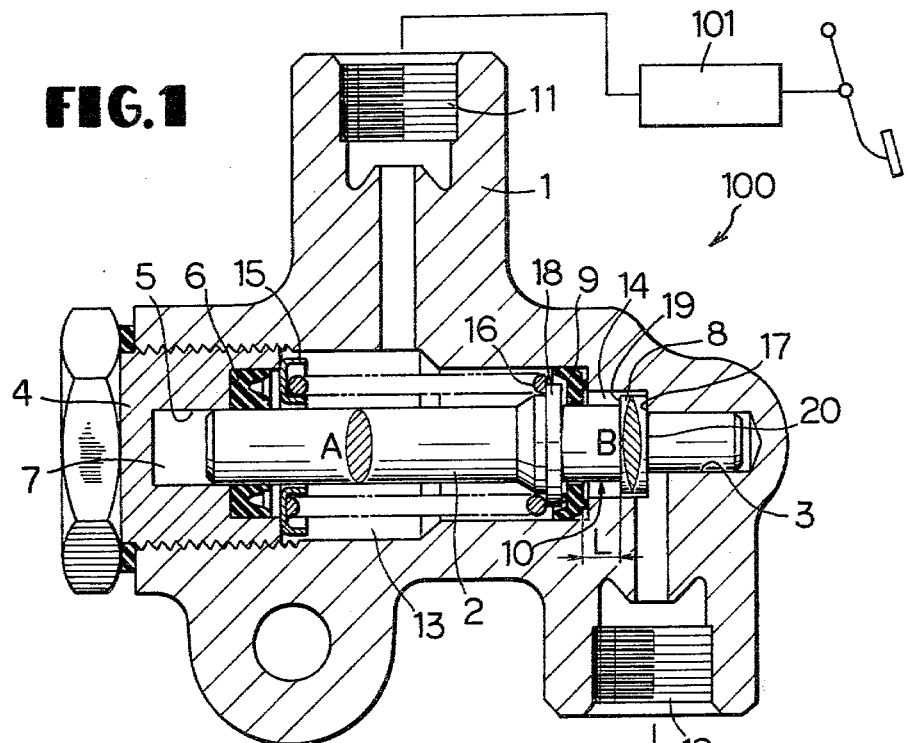
FIG. 1 is an axial cross-sectional view, of a first embodiment of a proportioning valve in accordance with this invention.

A housing 1 of a proportioning valve 100 in FIG. 1 accommodates a piston 2 therein, which is slidably supported in the axial direction by a small diametered bore 3, on one hand, formed in the housing 1 and a fitting bore 5, on the other hand, formed in a plug 4 threaded into the housing 1. Between the plug 4 and the piston 2 is fluid-tightly disposed a sealing cup 6 in order to form an air chamber 7, filled with air protecting the incoming of the brake fluid, in a space within the plug 4. The small diametered bore 3 in the housing 1 is non-fluid-tightly fitted by the piston 2, allowing the flow-in of the brake fluid thereinto.

A valve 8, firmly fixed on the piston 2 in a flange form, and a cylinder cup 9, disposed in the housing 1 functioning as a valve seat, form a cut valve 10' in the braking fluid circuit between a port 11 and another port 12 in order to open (communicate) and close (suspend) the fluid circuit. Contact of the valve 8 to the cylinder cup 9 divides the fluid chamber in the housing 1 into two. A chamber 13 on the left side of the cylinder cup 9 in FIG. 1 is called the first chamber and the other chamber 14 on the right side of the cylinder cup 9 is called the second chamber.

The piston 2 is usually biased to a separating or alienating direction, by a compression spring 16, which is supported via a spring supporter 15 by the plug 4, away from the air chamber 7, i.e., a direction in which the valve 8 is separated away from the cylinder cup 9. The valve 8 rests normally stationary abutting on a shoulder portion 17 of the housing 1. The braking fluid flowed under pressure in this status from the master cylinder 101 comes through the port 11 into the proportioning valve, passes through the first chamber 13, a gap between the cylinder cup 9 and a spring seat 18 in the piston 2, the second chamber 14, and the port 12, for being delivered to the rear wheel cylinders 102, 103. When the fluid pressure is raised the piston 2 is, overcoming the spring force of the compression spring 16, thrusted into the air chamber 7, followed by the contact of the valve 8 onto the cylinder cup 9. In this status, the piston 2 receives the pressure of the first chamber 13, i.e., the pressure of the master cylinder Pm on the smaller pressure receiving area 19, which is the subtraction B-A, the cross-sectional area B of the valve 8 minus the cross-sectional area A of the piston 2, and the pressure of the second chamber 14, i.e., the pressure of the rear wheel cylinders Pw on the greater pressure receiving area 20, which is equal to the cross-sectional area of the valve 8. When the master cylinder pressure is further raised, the two mutually opposite directional urging force perform, by the balance therebetween, the well-known pressure reducing operation. The above-mentioned function is similar to the prior art technology; in this invention, however, the greatest separable distance L between the valve 8 and the cylinder cup 9 is made larger than usual and the load characteristic of the compression spring 16 is set in a different way from the conventional ones. In the conventional proportioning valves the greatest separable distance between the valve 8 and the cylinder cup 9 is minute only for allowing the passage of the braking fluid, and the load characteristic of the compression spring 16 is set only on the consideration of such a fluid pressure at which the pressure reducing operation can be started. In this invention, on the contrary, the greatest separable distance L as well as the load characteristic of the compression spring 16 are to be set at which the absorption of the fluid pressure vibration is fully performed.

Figure 2:
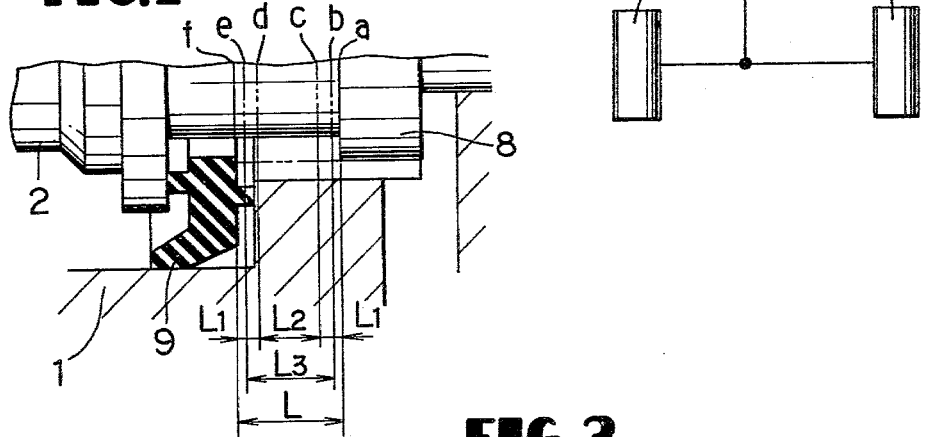
FIG. 2 is an enlargement of an essential part of the proportioning valve shown in FIG. 1.

This characteristic will be described in detail, with reference to the enlarged drawing in FIG. 2 of the valve 8 and the cylinder cup 9. In this explanation a case in which one of the rear wheel cylinders is affected by the fluid vibration is assumed; however, if the fluid vibration should happen by chance in both wheel cylinders at the same time, the sum of both vibrations must be considered as the object to be countermeasured. The signs a to f appearing in the description shall be understood as to respectively show the position of the valve 8 as follows:

a: position at which the fluid pressure acts to initiate the shifting of the piston, most separated position from the cylinder cup 9;

b: position at which the minimum fluid pressure acts when the fluid pressure vibration occurs at the point c;

c: position at which the lowest limit of the fluid pressure range for the possible fluid pressure vibration appears;

d: position at which the upper limit of the fluid pressure range for the possible fluid pressure vibration appears;

e: position at which the maximum fluid pressure acts when the fluid pressure vibration occurs at the point d; and f: position at which the fluid pressure for starting pressure reducing operation of the proportioning valve acts (wherein the piston abuts on the cylinder cup).

Figure 3:
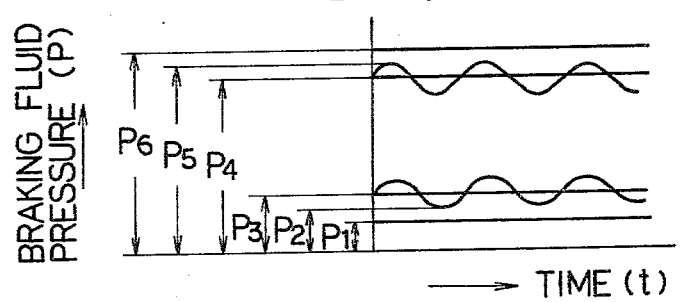
FIG. 3 is a graph for explaining the operation of the proportioning valve shown in FIG. 1.

The braking fluid pressure and the load of the compression spring corresponding to the respective position a to f of the valve 8 are indicated as the table below and the braking fluid pressure at each stage are shown in FIG. 3.

| position of the valve 8 | braking fluid pressure | spring load |
|---|---|---|
| a | $P_1$ | $F_1$ |
| b | $P_2$ | $F_2$ |
| c | $P_3$ | $F_3$ |
| d | $P_4$ | $F_4$ |
| e | $P_5$ | $F_5$ |
| f | $P_6$ | $F_6$ |

Assume herewith that:

V is the varied amount of fluid in the rear wheel cylinder when the piston in the rear wheel cylinder 102 or 103 reciprocates due to the insufficient or mal-cylindricity or the mal-concentricity of the brake drum;

A is the cross-sectional area of the piston 2, then the stroke $2L_1$ of the piston 2 required for absorbing the above-mentioned varied amount of the fluid is indicated by the following formula:

$$2L_1 = V/A$$

and the spring constant K of the compression spring 16 is determined by the following formula:

$$K = \frac{F_5 - F_4}{L_1} = \frac{F_3 - F_2}{L_1} = \frac{P_5 - P_4}{A \cdot L_1} = \frac{P_3 - P_2}{A \cdot L_1}$$

and further the stroke $L_2$ of the piston 2, when the fluid pressure varied from the minimum limit to the maximum limit of the fluid pressure range wherein the fluid pressure vibration may occur, can be determined by the following formula:

$$L_2 = \frac{F_4 - F_2}{K} = \frac{P_4 - P_3}{A \cdot K}$$

Therefore, the stroke $L_3$ of the piston 2 necessary for the absorption of the entire fluid pressure vibration can be determined by the following formula:

$$L_3 = 2L_1 + L_2 = \frac{V}{A}\left(1 + \frac{P_4 - P_3}{2(P_5 - P_4)}\right)$$

Furthermore, the piston 2 in this embodiment is required to function for the pressure reducing operation, which is inherent to the proportioning valve, in addition to the absorption of the fluid pressure vibration. So the conditions $P_6 \geq P_5$ and $P_1 \leq P_2$ are required to be satisfied. It leads to the conclusion that the greatest separable distance L between the valve 8 and the cylinder cup 9 must satisfy the formula:

$$L \geq L_3,$$

and the set load F of the compression spring 16 must satisfy the formula:

$$F_1 \leq F_2.$$

As the proportioning valve of this invention is of such a construction as described above, when the fluid pressure has been raised up to the lowest limit of the fluid pressure range, which confines the sphere of the brake-vibration-causing fluid pressure vibration, the piston 2 is already spaced from the shoulder portion 17, resisting the spring force of the compression spring 16, for proceeding into the air chamber 7. Even when some variation of the fluid amount occurs in the rear wheel cylinder 102 or 103 under this status, that variation of the fluid amount can be absorbed by the reciprocal movement of the piston 2 to mitigate the fluid pressure vibration, leading to an effective prevention of the brake vibration.

In other words, if a fluid pressure fluctuation arises in a rear wheel cylinder, it will be transmitted to the proportioning valve by way of the piping; in case there is, however, an increase of pressure in the proportioning valve, the piston 2 is shifted, resisting the action of the compression spring 16, to the side of the air chamber 7, and contrary to this, in case of pressure decreasing the piston 2 is urged back due to the action of the compression spring 16, to the side of the valve 8 to hold down the pressure fluctuation within the brake system, which leads to the prevention of the brake vibration.

As for a case, in which the braking fluid pressure has reached the upper limit of the range confining the sphere of the possible fluid pressure vibration, a variation of the fluid amount in the rear wheel cylinder 102 or 103 can be favorably absorbed by the minute but smooth reciprocation of the piston 2, because the valve 8 is not yet in abutment onto the cylinder cup 9.

All of the fluid pressure vibrations in the predetermined range or sphere of the fluid pressure may be mitigated like this. When the braking fluid pressure has been raised further exceeding the upper limit of the sphere, the valve 8 is contacted with the cylinder cup 9, rendering the proportioning valve function just like in the conventional ones, i.e., the pressure reducing operation begins to work for controlling the pressure rising rate in the rear wheel cylinders 102, 103 lower than that in the master cylinder 101.

Figure 4:
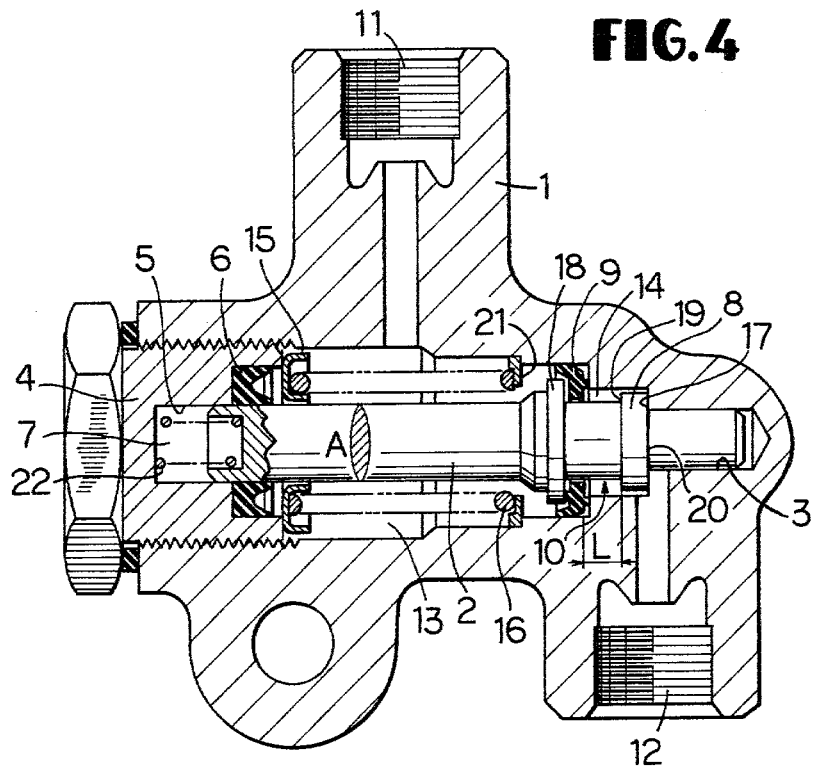
FIG. 4 is an axial cross-sectional view, of a second embodiment of a proportioning valve in accordance with this invention.

Another embodiment, in FIG. 4, of this invention is in major part thereof similar to the previous one, so like parts are alotted like numerals and signs as possible to omit unnecessary descriptions. The compression spring 16 herein is not usually in contact with the piston 2, but supported, via a spring carrier 21, by the housing 1. Another compression spring 22 is disposed in the air chamber 7 between the piston 2 and the plug 4. These two points, different from the previous embodiment, makes it possible that the mitigation of the fluid pressure vibration is performed by the compression spring 22 and the pressure control in the rear wheel cylinders is performed by the action of the compression springs 16 and 22 after the piston 2 has been contacted with the spring carrier 21. This embodiment is effective when the difference between the upper limit of the fluid pressure range (in which fluid pressure vibration occurs) and the fluid pressure, at which the pressure reducing operation is initiated, is great.

Figure 5:
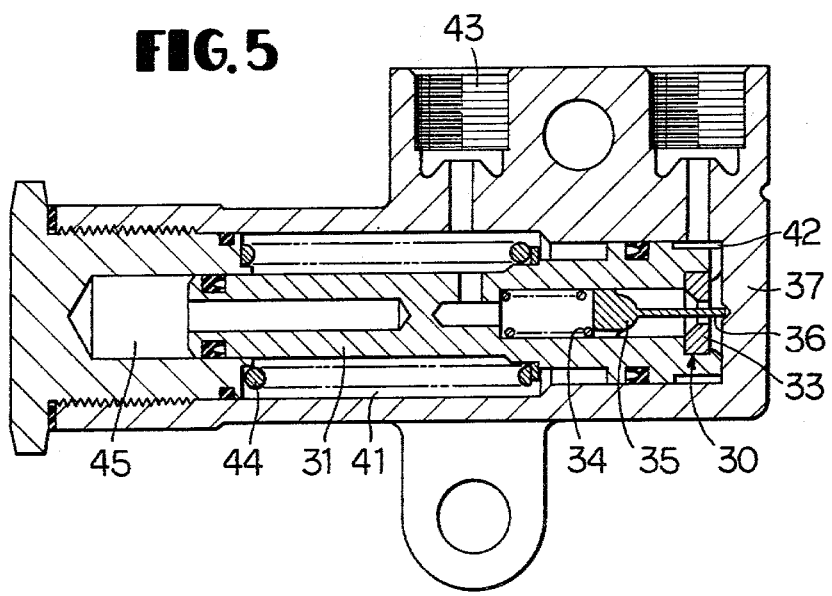
FIG. 5 is an axial cross-sectional view, of a third embodiment of a proportioning valve in accordance with this invention.

A third embodiment, in FIG. 5, of this invention is different from the previous embodiments in the construction of the cut valve. Against the construction of the cut valve in the above-mentioned embodiments, wherein the valve 8 fixed to the piston 2 and the fixedly positioned valve seat (cylinder cup 9) constitute the cut valve 10, a valve seat 33 fixedly fitted in a recess of the piston 31 and a valve 35 constantly biased toward the valve seat 33 by a compression spring 34 constitute a cut valve 30 herein. The valve 35 is provided with a projection 36, on the end portion facing the valve seat 33, which is constantly in contact with the housing 37 to keep the valve 35 away from the valve seat 33. This constant separation of the valve 35 from the valve seat 33 allows the communication of the first chamber 41 and the second chamber 42 formed on either side of the cut valve 30, an inbetween. When the fluid pressure of the master cylinder is raised to be delivered into the port 43, the piston 31 will be thrusted, resisting the spring force of the compression spring 44, in the air chamber 45, rendering the protruded portion of the projection 36 out of the valve seat 33 gradually longer. When finally the valve 35 is contacted with the valve seat 33, the braking fluid passage will be suspended (closed) to initiate the pressure reducing operation. Since the projection 36 for contacting is made longer in this embodiment than the usual one, and the load characteristic of the compression spring 44 is selected in a similar way to the previous embodiment shown in FIG. 1, the piston stroke, from the initial movement of the piston to the beginning of the pressure reducing operation, is comparatively long, the piston 31 can function for mitigating the fluid pressure vibration in the meantime, by absorbing it taking advantage of the longer piston stroke.

This invention has enabled the proportioning valve, only by slightly altering its design, to function as an absorber of the fluid pressure vibration without sacrificing the proper function of the fluid pressure regulation at all. It means the effective prevention of the brake vibration without any appreciable increasing of the manufacturing cost of the brake system.

The present invention should of course not be interpreted to be limited to the embodiments disclosed herewith, but various modifications and variations are practicable for those skilled in the art without departing from the spirit and scope of the invention.

What is claimed is:

1. In a brake vibration preventing type proportioning valve for a hydraulic brake system, the valve comprising:
    an inlet to be connected to a master cylinder of said brake system;
    an outlet to be connected to at least one rear wheel brake cylinder of said brake system;
    a cut valve arranged between said inlet and said outlet;
    a piston controlling said cut valve being provided with on its inlet side a shaft which is of given cross section, is exposed to atmospheric pressure and provides a pressure receiving area corresponding to said cross section of said shaft, said piston being biased in a direction to open said cut valve by spring means, and being to close said cut valve at a predetermined pressure and to receive, with said cut valve closed, on a smaller effective surface thereof in cut-valve-opening direction inlet pressure and on a larger effective surface thereof in cut-valve-closing direction outlet pressure, the improvement wherein said piston of said proportioning valve has a stroke L between an inoperative position and the cut valve closing position which fulfills the condition:

$$L \geqq \frac{V}{A}\left(1 + \frac{P_4 - P_3}{2(P_5 - P_4)}\right), \text{ wherein}$$

wherein
- V is the volume of fluctuation in the rear wheel brake cylinder which is caused by irregularities in the rotating members of the rear wheel brakes and which causes pressure fluctuations,
- A is the cross-section area of said shaft,
- P4 is the maximal pressure at which pressure fluctuations causing the brake vibration can occur,
- P3 is the minimum pressure at which pressure fluctuations causing the brake vibration can occur,
- P5 is the value of P4 raised by the amplitude of the pressure fluctuations, and wherein the pressure at which said cut valve closes is equal to or greater than the pressure P5.

2. A proportioning valve in accordance with claim 1, wherein said cut valve is composed of a valve firmly disposed on said piston and a fixedly positioned valve seat.

3. A proportioning valve in accordance with claim 1, wherein said cut valve includes a valve seat fixedly positioned in relation to said piston, a valve constantly biased to said valve seat, and a projection for contacting, which is disposed between said valve and a housing accommodating said piston for keeping said valve away from said valve seat so long as the amount of shifting of said piston in the cut-valve-closing direction remains below said stroke L.

4. A proportioning valve in accordance with claim 1, wherein said projecting is secured to said valve.

5. A proportioning valve in accordance with claim 1, wherein said spring means is a single compression coil spring.

6. A proportioning valve in accordance with claim 1, wherein said spring means is composed of a pair of compression coil springs, only one of which normally acting on said piston, and the other begins to act on said piston when said piston has been shifted in the cut-valve-closing direction exceeding the valve $$\frac{V}{A}\left(1 + \frac{P_4 - P_3}{2(P_5 - P_4)}\right).$$

* * * * *